US011126392B2

(12) United States Patent
Sim et al.

(10) Patent No.: US 11,126,392 B2
(45) Date of Patent: Sep. 21, 2021

(54) DISPLAY APPARATUS AND METHOD OF CONTROLLING THE SAME

(71) Applicant: Samsung Electronics Co., Ltd., Suwon-si (KR)

(72) Inventors: Wha Seob Sim, Suwon-si (KR); Je Ik Kim, Suwon-si (KR)

(73) Assignee: SAMSUNG ELECTRONICS CO., LTD, Suwon-si (KR)

( * ) Notice: Subject to any disclaimer, the term of this patent is extended or adjusted under 35 U.S.C. 154(b) by 0 days.

(21) Appl. No.: 16/728,663

(22) Filed: Dec. 27, 2019

(65) Prior Publication Data

US 2020/0218493 A1 Jul. 9, 2020

(30) Foreign Application Priority Data

Jan. 3, 2019 (KR) ........................ 10-2019-0000656

(51) Int. Cl.
*G06F 3/14* (2006.01)
*G09G 5/14* (2006.01)
*G06F 3/16* (2006.01)

(52) U.S. Cl.
CPC .......... *G06F 3/1454* (2013.01); *G06F 3/1423* (2013.01); *G06F 3/16* (2013.01); *G09G 5/14* (2013.01); *G09G 2370/16* (2013.01)

(58) Field of Classification Search
CPC ....... G06F 3/1454; G06F 3/1423; G09G 5/14; G09G 2370/16
See application file for complete search history.

(56) References Cited

U.S. PATENT DOCUMENTS 8,613,070 B1 * 12/2013 Borzycki ................ H04L 67/10
726/8
9,990,129 B2 * 6/2018 Yang ..................... G06F 9/4856
(Continued)

FOREIGN PATENT DOCUMENTS

EP 3410754 12/2010
GB 2534672 A * 8/2016 ......... H04L 67/1078
(Continued)

OTHER PUBLICATIONS

International Search Report dated May 4, 2020 in International Patent Application No. PCT/KR2020/000083.

*Primary Examiner* — Nitin Patel
*Assistant Examiner* — Robert M Stone
(74) *Attorney, Agent, or Firm* — Staas & Halsey LLP (57) ABSTRACT

A display apparatus capable of omitting a device discovery process and a service discovery process and simplifying a W-Fi Direct connection procedure includes a memory; a display; communication circuitry configured to communicate with the server and the source device; and a controller configured to execute the screen mirroring service with the source device. The controller is configured to, when a start command of the screen mirroring service is input by a user, control the display to display the source device connected to a cloud account, in response to an input of the user who selects the source device, to perform the Wi-Fi Direct connection with the source device based on first Wi-Fi Direct configuration information stored in the memory and second Wi-Fi Direct configuration information obtained from the server, and to control the display to output a screen of the source device.

16 Claims, 9 Drawing Sheets

(56) References Cited

U.S. PATENT DOCUMENTS

| | | | | |
|---|---|---|---|---|
| 10,277,698 B1* | 4/2019 | Gerard | H04L 65/4092 |
| 10,338,877 B2* | 7/2019 | Song | G06F 3/04845 |
| 10,455,632 B2* | 10/2019 | Baron | H04W 8/005 |
| 10,548,003 B2* | 1/2020 | Lee | H04W 12/37 |
| 10,631,039 B2* | 4/2020 | Shin | H04N 21/422 |
| 10,652,385 B2* | 5/2020 | Hillier | H04M 1/7253 |
| 2012/0042102 A1* | 2/2012 | Chung | H04M 1/7253 710/33 |
| 2012/0051345 A1* | 3/2012 | Vedantham | H04L 67/104 370/338 |
| 2012/0062688 A1* | 3/2012 | Shen | G06F 9/451 348/14.03 |
| 2012/0069131 A1* | 3/2012 | Abelow | G06Q 10/067 348/14.01 |
| 2012/0188147 A1* | 7/2012 | Hosein | H04N 21/4222 345/2.2 |
| 2012/0192084 A1* | 7/2012 | Dura | G06F 3/0481 715/751 |
| 2013/0007499 A1* | 1/2013 | Moy | H04L 67/148 713/400 |
| 2013/0054634 A1* | 2/2013 | Chakraborty | H04L 67/1091 707/769 |
| 2013/0081083 A1* | 3/2013 | Yu | H04N 21/4622 725/40 |
| 2013/0141331 A1* | 6/2013 | Shiu | G09G 5/003 345/158 |
| 2013/0238702 A1* | 9/2013 | Sheth | H04L 67/38 709/204 |
| 2014/0019786 A1* | 1/2014 | Green | G06F 1/325 713/320 |
| 2014/0025744 A1* | 1/2014 | Kim | G06F 3/1454 709/204 |
| 2014/0025847 A1* | 1/2014 | Choi | H04L 12/1836 710/33 |
| 2014/0119356 A1 | 5/2014 | Huang | |
| 2014/0157378 A1* | 6/2014 | Childs | H04L 63/102 726/6 |
| 2014/0171064 A1* | 6/2014 | Das | H04W 84/18 455/426.1 |
| 2014/0173036 A1* | 6/2014 | Das | G06F 1/3212 709/219 |
| 2014/0173447 A1* | 6/2014 | Das | G06F 3/0484 715/738 |
| 2014/0181691 A1* | 6/2014 | Poornachandran | H04M 1/72412 715/753 |
| 2014/0186049 A1* | 7/2014 | Oshima | H04W 4/21 398/118 |
| 2014/0344420 A1* | 11/2014 | Rjeili | H04L 43/04 709/220 |
| 2014/0351444 A1* | 11/2014 | Qi | H04L 67/1068 709/227 |
| 2015/0046852 A1* | 2/2015 | Furtwangler | G06F 9/451 715/762 |
| 2015/0082184 A1* | 3/2015 | Kim | H04W 4/80 715/740 |
| 2015/0082241 A1* | 3/2015 | Kang | H04N 7/15 715/803 |
| 2015/0092233 A1* | 4/2015 | Park | H04N 1/00307 358/1.15 |
| 2015/0201023 A1* | 7/2015 | Kotab | H04L 65/60 709/208 |
| 2015/0245393 A1* | 8/2015 | Lee | H04L 67/1046 370/338 |
| 2015/0319485 A1 | 11/2015 | Vedula et al. | |
| 2015/0370915 A1* | 12/2015 | Kim | G06F 16/986 370/311 |
| 2015/0373401 A1* | 12/2015 | Kwon | H04L 12/2809 725/30 |
| 2016/0020803 A1* | 1/2016 | Cha | H04W 8/205 455/558 |
| 2016/0034539 A1* | 2/2016 | Yoon | G06F 16/951 707/769 |
| 2016/0050263 A1* | 2/2016 | Hwang | H04L 67/10 709/206 |
| 2016/0050326 A1* | 2/2016 | Lee | H04N 1/00244 358/402 |
| 2016/0057567 A1* | 2/2016 | Nakagawa | H04W 4/80 455/41.1 |
| 2016/0112839 A1* | 4/2016 | Choi | H04W 4/80 455/41.2 |
| 2016/0134689 A1* | 5/2016 | Vendrow | H04L 67/16 709/204 |
| 2016/0134929 A1* | 5/2016 | Robii | H04N 21/41407 725/81 |
| 2016/0134996 A1* | 5/2016 | Verma | H04L 12/1822 709/205 |
| 2016/0135233 A1* | 5/2016 | Fujita | H04M 1/7253 370/329 |
| 2016/0164961 A1* | 6/2016 | Malaviya | H04L 67/141 709/201 |
| 2016/0179295 A1* | 6/2016 | Liang | G06F 3/1454 715/740 |
| 2016/0266863 A1* | 9/2016 | Song | G06F 3/04845 |
| 2016/0286172 A1* | 9/2016 | Weng | H04N 7/183 |
| 2016/0294925 A1* | 10/2016 | Prashant | G06F 9/541 |
| 2016/0323863 A1* | 11/2016 | Park | H04W 4/70 |
| 2016/0338120 A1* | 11/2016 | Boyle | G06T 3/4092 |
| 2016/0378422 A1* | 12/2016 | Kenjalkar | H04L 65/1089 726/6 |
| 2017/0054571 A1* | 2/2017 | Kitchen | H04L 12/4625 |
| 2017/0149873 A1* | 5/2017 | Jang | H04N 21/4402 |
| 2017/0171892 A1* | 6/2017 | Lee | H04L 65/4084 |
| 2017/0199715 A1* | 7/2017 | Manchinasetti | H04N 21/47 |
| 2017/0235435 A1* | 8/2017 | Sohn | G06F 3/1454 715/738 |
| 2017/0251238 A1* | 8/2017 | Feldman | G09G 5/14 |
| 2017/0311368 A1* | 10/2017 | Kandur Raja | H04W 4/80 |
| 2017/0315769 A1* | 11/2017 | Penke | G06F 3/1423 |
| 2018/0091501 A1 | 3/2018 | Trahe et al. | |
| 2018/0183840 A1* | 6/2018 | Lee | H04W 76/10 |
| 2018/0219944 A1 | 8/2018 | Kwon et al. | |
| 2018/0341453 A1* | 11/2018 | Nakagawa | H04M 1/72412 |
| 2018/0359307 A1* | 12/2018 | Mujibiya | G06F 16/27 |
| 2019/0149772 A1* | 5/2019 | Fernandes | G06F 3/0486 348/159 |
| 2019/0200281 A1* | 6/2019 | Inohiza | H04W 76/14 |
| 2019/0349738 A1* | 11/2019 | Yamaura | H04L 67/1068 |
| 2019/0394519 A1* | 12/2019 | Yamakawa | H04N 21/47217 |
| 2020/0007921 A1* | 1/2020 | Ojala | H04N 13/161 |
| 2020/0236152 A1* | 7/2020 | Bradley | H04L 67/303 |

FOREIGN PATENT DOCUMENTS

| | | |
|---|---|---|
| KR | 10-2013-0095983 | 8/2013 |
| KR | 10-2014-0002927 | 1/2014 |
| KR | 10-2017-0076406 | 7/2017 |
| KR | 10-2018-0092800 | 8/2018 |

\* cited by examiner

<PRIOR ART>

FIG.6

| Wi-fi direct configuration information |
|---|
| Length of WSC attributes |
| Manufacturer |
| Model Name |
| Model Number |
| Out-of-Band Device Password |
| Public Key Hash |
| Device Password ID |
| Device Password |
| RF Bands |
| Serial Number |
| UUID-E |
| WFA Vendor Extension (includes Version2 sub element) |
| Length of P2P attributes |
| P2P Capability |
| P2P Device Info |
| Out of Band Group Owner Negotiation Channel |
| Channel list (conditional) |
| P2P Group Info (Conditional on Group Owner) |
| P2P Group ID (Conditional on Group Owner) |
| SSID |
| MAC address |
| Group Owner Intent |

DISPLAY APPARATUS AND METHOD OF CONTROLLING THE SAME

CROSS-REFERENCE TO RELATED APPLICATIONS

This application is based on and claims priority under 35 U.S.C. § 119 to Korean Patent Application No. 10-2019-0000656, filed on Jan. 3, 2019 in the Korean Intellectual Property Office, the disclosure of which is incorporated by reference in its entirety.

BACKGROUND

1. Field

The disclosure relates to a display apparatus capable of simplifying a procedure of directly connecting a source device to W-Fi Direct in executing a screen mirroring service, and a method of controlling the display apparatus.

2. Description of the Related Art

W-Fi Direct or Wi-Fi peer-to-peer (P2P) has been applied as a direct communication technology that enables devices to easily connect with each other without a wireless access point (AP) basically required in a conventional WLAN system. A W-Fi Direct network is proposed by the Wi-Fi Alliance as a network that enables device-to-peer communication with each other without the need for devices to join home, office, and hotspot networks.

In addition, screen mirroring or Miracast technology based on W-Fi Direct technology has been developed due to an increasing demand for wireless sharing of contents such as video and music among various devices in real time.

W-Fi Direct communication enables different peer-to-peer (P2P) services (e.g., file sharing, media sharing, etc.). A device wanting to perform the Wi-Fi Direct communication needs to form a W-Fi Direct group with another device.

However, when the W-Fi Direct group is formed, a prior art performs W-Fi Direct connection between devices through a process of forming the Wi-Fi Direct group after a device discovery process and a service discovery process. That is, since the prior art goes through a complicated procedure, it takes a long period of time to form the W-Fi Direct network and inconveniences a user.

SUMMARY

Therefore, it is an aspect of the disclosure to provide a display apparatus capable of omitting a device discovery process and a service discovery process and simplifying a Wi-Fi Direct connection procedure by connecting Wi-Fi Direct with a source device connected to a cloud account through a server in executing a screen mirroring service, and a method of controlling the display apparatus.

It is another aspect of the disclosure to provide the display apparatus capable of performing W-Fi Direct connection with the source device even if a user operates only a sink device, and a method of controlling the display apparatus.

It is another aspect of the disclosure to provide the display apparatus capable of improving security stability since the Wi-Fi Direct connection between authenticated devices is performed through the cloud account.

Additional aspects of the disclosure will be set forth in part in the description which follows and, in part, will be obvious from the description, or may be learned by practice of the disclosure.

In accordance with an aspect of the disclosure, a display apparatus includes a memory; a display; communication circuitry configured to communicate with a server and a source device; and a controller configured to execute a screen mirroring service with the source device. The controller may be configured to, when a start command of the screen mirroring service is input by a user, control the display to display the source device connected to a cloud account, in response to an input of the user who selects the source device, to perform Wi-Fi Direct connection with the source device based on first Wi-Fi Direct configuration information stored in the memory and second Wi-Fi Direct configuration information obtained from the server, and to control the display to output a screen of the source device.

The controller may be configured to obtain a plurality of source device information connected to the cloud account from the server and control the display to display a plurality of the source devices, and to perform the Wi-Fi Direct connection with the source device selected by the user input among the plurality of source devices.

The controller may be configured to access the cloud account using cloud account information input by the user or cloud account information previously stored in the memory, and to register the first W-Fi Direct configuration information including a Service Set ID (SSID), a MAC address, channel information, and a password in the server.

The controller may be configured to generate a connection request message for the source device and transmit the connection request message to the source device through the server, and when receiving a connection select message of the source device in response to the connection request message through the server, to perform the Wi-Fi Direct connection.

The controller may be configured to determine a peer-to-peer (P2P) operating channel based on the first Wi-Fi Direct configuration information and the second Wi-Fi Direct configuration information.

The controller may be configured to generate a Wi-Fi Direct group by performing provision discovery and group owner negotiation.

The controller may be configured to obtain information of the source device capable of providing the screen mirroring service among the plurality of source devices connected to the cloud account from the server, and to control the display to display the source device capable of providing the screen mirroring service.

The display apparatus may further include a speaker. The controller may be configured to control the speaker to output a sound source being output by the source device.

In accordance with another aspect of the disclosure, a method of controlling a display apparatus includes receiving, by a controller, a start command of a screen mirroring service from a user; accessing, by the controller, a cloud account through a server; displaying, by the controller, a source device connected to the cloud account on a display; in response to an input of the user who selects the source device, performing Wi-Fi Direct connection with the source device based on first Wi-Fi Direct configuration information and second Wi-Fi Direct configuration information obtained from the server; and displaying, by the controller, a screen of the source device on the display.

The displaying of the source device on the display may include obtaining a plurality of source device information connected to the cloud account from the server and displaying a plurality of the source devices on the display. The performing of the Wi-Fi Direct connection may include performing the W-Fi Direct connection with the source device selected by the user input among the plurality of source devices.

The accessing of the cloud account may include accessing the cloud account using cloud account information input by the user or cloud account information previously stored in a memory; and registering the first Wi-Fi Direct configuration information including a Service Set ID (SSID), a MAC address, channel information, and a password in the server.

The performing of the Wi-Fi Direct connection may include generating a connection request message for the source device and transmit the connection request message to the source device through the server; and when receiving a connection select message of the source device in response to the connection request message through the server, performing the Wi-Fi Direct connection.

The performing of the Wi-Fi Direct connection may include determining a peer-to-peer (P2P) operating channel based on the first Wi-Fi Direct configuration information and the second Wi-Fi Direct configuration information.

The performing of the Wi-Fi Direct connection may include generating a Wi-Fi Direct group by performing provision discovery and group owner negotiation.

The displaying of the source device on the display may include obtaining information of the source device capable of providing the screen mirroring service among the plurality of source devices connected to the cloud account from the server; and controlling the display to display the source device capable of providing the screen mirroring service.

The method may further include receiving, by the controller, a sound source being output by the source device and outputting the sound source to a speaker.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

The present specification clarifies a scope of the disclosure, describes the principles of the disclosure, and discloses the embodiments so that those skilled in the art can carry out the disclosure. The disclosed embodiments can be implemented in various forms.

Like reference numerals refer to like elements throughout the specification. Not all elements of exemplary embodiments of the disclosure will be described, and description of what are commonly known in the art or what overlap each other in the embodiments will be omitted. The terms as used throughout the specification, such as "~ part," "~ module," "~ member," "~ block," etc., may be implemented in software and/or hardware, and a plurality of "~ parts," "~ modules," "~ members," or "~ blocks" may be implemented in a single element, or a single "~ part," "~ module," "~ member," or "~ block" may include a plurality of elements.

When a part "includes" or "comprises" an element, unless there is a particular description contrary thereto, the part may further include other elements, not excluding the other elements. Also, it will be understood that, although the terms first, second, third, etc., may be used herein to describe various elements, it should not be limited by these terms. These terms are only used to distinguish one element from another element. As used herein, the singular forms "a," "an" and "the" are intended to include the plural forms as well, unless the context clearly indicates otherwise.

It will be understood that when an element is referred to as being "connected" to another element, it can be directly or indirectly connected to the other element, wherein the indirect connection includes "connection" via a wireless communication network.

An identification code is used for the convenience of the description but is not intended to illustrate the order of each step. Each of the steps may be implemented in an order different from the illustrated order unless the context clearly indicates otherwise.

The principle and exemplary embodiments of the disclosure will now be described with reference to the accompanying drawings.

Figure 1:
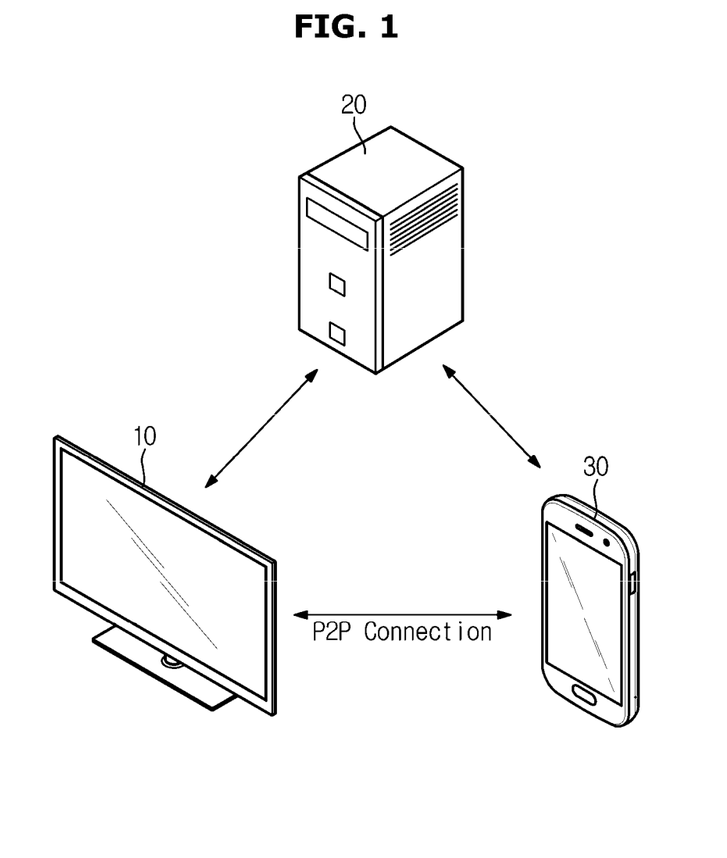
FIG. 1 is a view for briefly describing that a Wireless Fidelity (W-Fi) Direct network is formed between devices.

FIG. 1 is a view for briefly describing that a Wireless Fidelity (W-Fi) Direct network is formed between devices.

Referring to FIG. 1, a display apparatus 10 may be directly connected to a source device 30 through a Wireless Fidelity (W-Fi) Direct network (P2P connection). Meanwhile, the display apparatus 10 may be referred to as a first device and the source device 30 may be referred to as a second device, or may be simply referred to as a Wi-Fi Direct device or a P2P device. In addition, when the display apparatus 10 receives data from the source device 30, the display apparatus 10 may be referred to as a sink device.

In FIG. 1, one smartphone is illustrated as the source device 30 connected to the display apparatus 10, but a plurality of the source devices 30 may be provided. In addition, the Wi-Fi Direct device may include various devices configured to support Wi-Fi Direct, such as a display apparatus, a printer, a digital camera, a projector, a smartphone, a Blu-ray player, a game console, and the like. The display apparatus 10 and the source device 30 may each include a Wi-Fi Direct module for Wi-Fi Direct communication and a communication module for communicating with a server 20.

The display apparatus 10 and the source device 30 may be connected to the server 20, respectively. The display apparatus 10 and the source device 30 may be connected to a cloud account through the server 20. The server 20 may obtain information of devices connected to the same cloud account, and register or store information of corresponding devices. For example, the server 20 may register or store W-Fi Direct configuration information of the display apparatus 10 and Wi-Fi Direct configuration information of the source device 30 connected to the same cloud account. The W-Fi Direct configuration information of the display apparatus 10 may be referred to as first W-Fi Direct configuration information, and the W-Fi Direct configuration information of the source device 30 may be referred to as second Wi-Fi Direct configuration information.

The W-Fi Direct configuration information may include a Service Set ID (SSID), a MAC address, channel information, a password, and the like. In addition, the Wi-Fi Direct configuration information may further include service information that can be provided. Since services that each P2P device can provide may be different, it is necessary to exchange the service information that can be provided between the P2P devices. The W-Fi Direct configuration information will be described later.

When the display apparatus 10 and the source device 30 are connected to the same cloud account, the display apparatus 10 and the source device 30 may recognize each other's existence without a separate device discovery procedure. In addition, a service discovery procedure for searching for a service that can be provided between the P2P devices may be omitted. That is, when the display apparatus 10 and the source device 30 access the cloud account, the server 20 may obtain information of the display apparatus 10 and information of the source device 30 and register the information of the display apparatus 10 and the information of source device 30 to the cloud account. The server 20 may provide the information to a device that requires W-Fi Direct connection. For example, when the display apparatus 10 and the plurality of source devices 30 are connected to the same cloud account, the display apparatus 10 may obtain information of the plurality of source devices 30 from the server 20, and may identify that the plurality of source devices 30 capable of directly connecting to W-Fi exists.

The display apparatus 10 may generate a connection request message for the source device 30 and transmit the connection request message to the source device 30 through the server 20. When there are the plurality of source devices 30, the display apparatus 10 may generate the connection request message for the source device 30 selected by a user input.

The source device 30 may generate a connection select message in response to the connection request message and transmit the connection select message to the display apparatus 10 through the server 20. Upon receiving the connection select message of the source device 30, the display apparatus 10 may generate a W-Fi Direct group based on the W-Fi Direct configuration information of the display apparatus 10 and the Wi-Fi Direct configuration information of the source device 30 and may perform the Wi-Fi direct connection with the source device 30.

The display apparatus 10 may generate the Wi-Fi Direct group by performing provision discovery and group owner negotiation. The process of performing the provision discovery and the group owner negotiation is called provisioning.

When the Wi-Fi Direct connection between the display apparatus 10 and the source device 30 is completed, the display apparatus 10 may execute a specific service in association with the source device 30. The specific service may include photo output, image output, file transmission/ reception, screen sharing, and the like. For example, when the source device 30 is the smartphone, the display apparatus 10 may receive content output from the source device 30 and output the content to the display. That is, screen mirroring or Miracast services may be executed.

Figure 2:
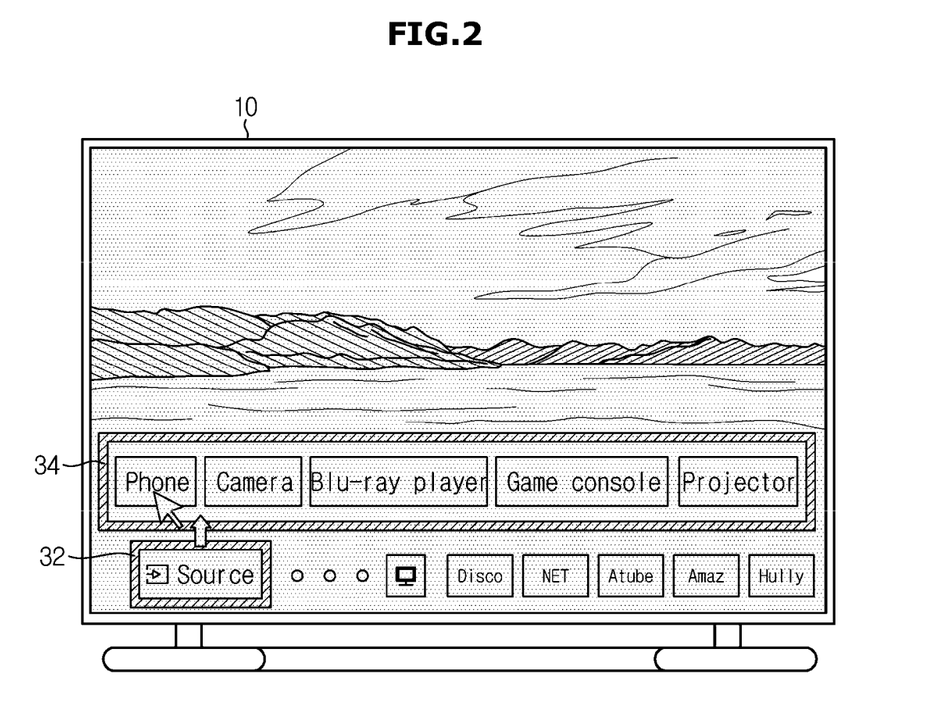
FIG. 2 is a view illustrating a display apparatus displaying a graphical user interface for executing a screen mirroring service according to exemplary embodiments of the disclosure.
Figure 3:
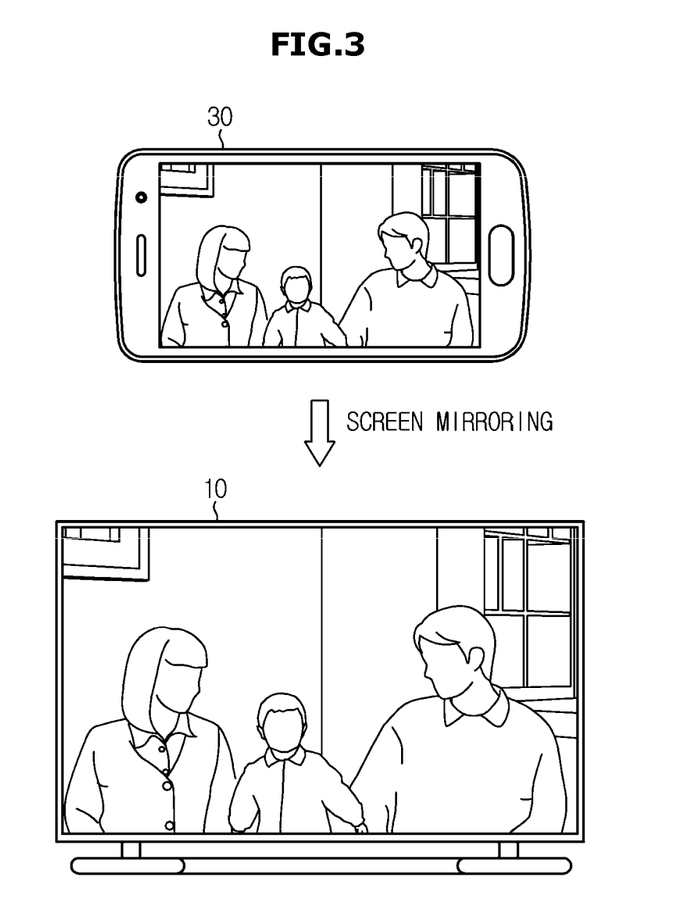
FIG. 3 is a view illustrating a display apparatus executing a screen mirroring service by performing W-Fi Direct connection with a source device according to exemplary embodiments of the disclosure.

FIG. 2 is a view illustrating a display apparatus displaying a graphical user interface for executing a screen mirroring service according to exemplary embodiments of the disclosure, and FIG. 3 is a view illustrating a display apparatus executing a screen mirroring service by performing Wi-Fi Direct connection with a source device according to exemplary embodiments of the disclosure.

Referring to FIG. 2, a controller 140 of the display apparatus 10 may generate graphical user interfaces (GUIs) including a source menu 32 configured to execute a screen mirroring service and provide information of the source device 30, and source icons 34 representing the plurality of source devices 30 (a phone, a camera, the Blu-ray player, the game console, the projector, as shown in FIG. 2) connected to the cloud account. The controller 140 may control a display 130 to display the generated graphical user interfaces 32 and 34. The graphical user interfaces 32 and 34 may be selected by the user.

The user may select the graphical user interfaces 32 and 34 using the display 130 including a touch panel. In addition, the user may select the graphical user interfaces 32 and 34 using an input device such as a remote controller capable of remotely controlling the display apparatus 10.

In FIG. 2, when the user selects a source menu 32, a start command of the screen mirroring service may be input. The display apparatus 10 may display the plurality of source devices 30 connected to the cloud account. At this time, the display apparatus 10 may obtain information of the source device 30 that can provide the screen mirroring service among the plurality of source devices 30 connected to the cloud account from the server 20, and may display the source device 30 capable of providing the screen mirroring service.

When the phone (smartphone) is selected as the source device 30, the display apparatus 10 may perform the Wi-Fi Direct connection with the phone and execute the screen mirroring service in association with the phone.

Referring to FIG. 3, the Wi-Fi Direct connection may be performed between the display apparatus 10 and the source device 30 to execute screen mirroring or Miracast services. The controller 140 of the display apparatus 10 may control to output the same screen as a screen of the source device 30 to the display 130. In addition, the display apparatus 10 may include a speaker, and may output a sound source output from the source device 30 through the speaker.

Figure 4:
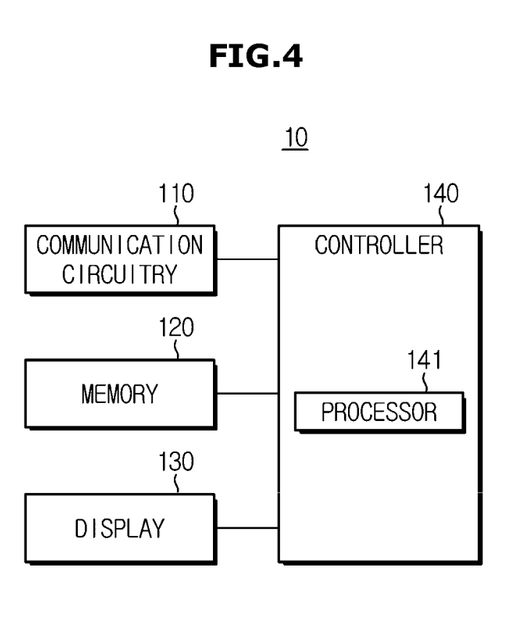
FIG. 4 is a view illustrating a configuration of a display apparatus according to exemplary embodiments of the disclosure.

FIG. 4 is a view illustrating a configuration of a display apparatus according to exemplary embodiments of the disclosure.

The display apparatus 10 may include communication circuitry 110, a memory 120, the display 130, and the controller 140. In addition, the source device 30 may also include the communication circuitry 110, the memory 120, the display 130, and the controller 140.

FIG. 4 illustrates the display apparatus 10 as an example of the W-Fi Direct device.

The communication circuitry 110 may include a Wi-Fi Direct module that conforms to the Institute of Electrical and Electronics Engineers (IEEE) 802.11b/g/n/ac standard and a communication module for communicating with the server 20. The communication circuitry 110 may include a wired communication module and/or a wireless communication module.

The memory 120 may store various data related to operations of the display apparatus 10. The memory 120 may store cloud account information and the W-Fi Direct configuration information. The memory 120 may store the W-Fi Direct configuration information of the display apparatus 10, and may store the W-Fi Direct configuration information of the source device 30 obtained from the server 20. In addition, the memory 120 may store algorithm data, a program, or an application for controlling the display apparatus 10.

The memory 120 may be implemented with at least one of a non-volatile memory device, such as a cache, Read Only Memory (ROM), Programmable ROM (PROM), Erasable Programmable ROM (EPROM), and Electrically Erasable Programmable ROM (EEPROM); a volatile memory device, such as Random Access Memory (RAM); or a storage medium, such as Hard Disk Drive (HDD) and Compact Disk (CD) ROM.

The display 130 may be provided as a light emitting diode (LED) panel, an organic light emitting diode (OLED) panel, or a liquid crystal display (Liquid Crystal Display) panel. The display 130 may include a touch panel. When the touch panel is included in the display 130, the display 130 may serve as the input device.

The controller 140 may include one or more processors 141. The processor 141 may transmit a control signal for controlling the display apparatus 10 according to a control algorithm stored in the memory 120. In addition, the processor 141 may execute a program or an application for operating the display apparatus 10. Although the controller 140 and the memory 120 have been described separately, the processor 141 and the memory 120 may be integrated in a single chip and may be physically separated.

The operations of the controller 140 are described in detail below.

Figure 5:
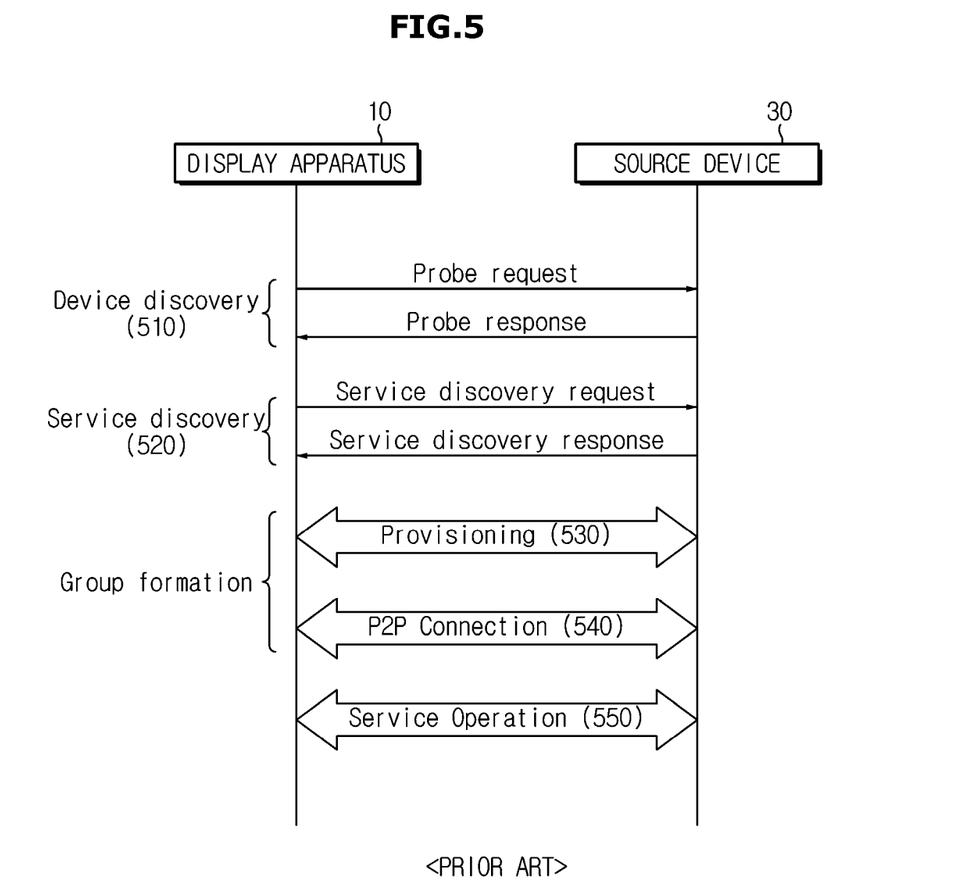
FIG. 5 is a flowchart for describing a Wi-Fi Direct connection method according to a prior art.
Figure 6:
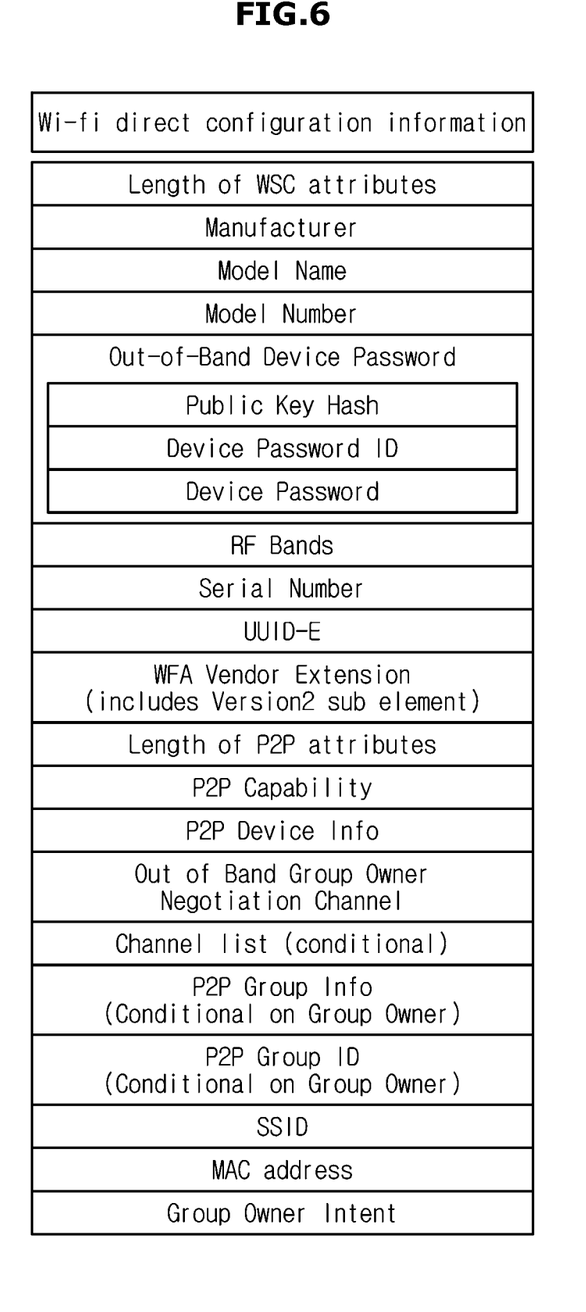
FIG. 6 is a view for describing Wi-Fi Direct configuration information.

FIG. 5 is a flowchart for describing a Wi-Fi Direct connection method according to a prior art, and FIG. 6 is a view for describing W-Fi Direct configuration information.

Referring to FIG. 5, the Wi-Fi Direct connection may include a device discovery process 510, a service discovery process 520, and a group formation process.

The device discovery process 510 may be a process required for the Wi-Fi Direct devices (P2P devices) to recognize each other in order to form the W-Fi Direct group. For example, in order for the display apparatus 10 to be directly connected to the source device 30 through W-Fi, the display apparatus 10 must recognize the presence of the source device 30. When a W-Fi Direct connection function is executed, the display apparatus 10 enters a device search mode and repeats a channel scan, listens, and searches for nearby W-Fi direct devices.

When the device discovery process 510 is performed, the display apparatus 10 may scan for all available wireless channels and repeat the channel scanning, listening, and searching until a common channel is found with the source device 30. A basic operation of the device discovery process 510 may be performed by exchanging a probe request message and a probe response message according to the IEEE 802.11 MAC protocol. Through the device discovery process 510, a list of devices capable of the W-Fi Direct connection may be obtained.

The probe request message and the probe response message may include the W-Fi Direct configuration information. The W-Fi Direct configuration information may be defined as including a peer-to-peer information element (P2P IE) and a W-Fi simple configuration information element (WSC IE).

Particularly, referring to FIG. 6, the W-Fi Direct configuration information may include Length of WSC Attributes, Manufacturer, Model Name, Model Number, Device Password ID, Device Password, RF Bands, Serial Number, Universal Unique Identifier (UUID), and WFA Vendor Extension. The Wi-Fi Direct configuration information may include information such as Length of P2P Attributes, P2P Capability, P2P Device Info, Group Owner Negotiation Channel, Channel List, P2P Group Information, P2P Group ID, SSID, MAC Address, Group Owner Intent, and the like.

The service discovery process 520 may be a process for identifying the service and a service protocol that can be provided between the Wi-Fi direct devices. The service discovery process 520 may be performed through the exchange of a service discovery request message and a service discovery response message. For example, when the display apparatus 10 intends to execute screen mirroring in association with the source device 30, it is necessary to identify whether each apparatus provides the screen mirroring service. In addition, when the display apparatus 10 intends to share a file with the source device 30, it is necessary to identify whether each device provides the same file sharing manner.

A group forming process may be a process of forming the W-Fi Direct group (or P2P group). The group forming process may include a provision discovery process for performing authentication between the display apparatus 10 and the source device 30 and a group owner negotiation process for determining a group owner. The process of performing the provision discovery and the group owner negotiation is referred to as provisioning (530).

The provision discovery process may be performed by a pin manner. For example, when the display apparatus 10 displays a PIN, authentication may be completed in such a manner that the user enters the PIN into the source device 30. The provision discovery may be performed in a variety of manners.

When the provision discovery process is completed, the group owner negotiation process between the display apparatus 10 and the source device 30 may be performed. The group owner negotiation process may be a process of determining a group owner GO and a group client that play a role of a virtual access point AP among the display apparatus 10 and the source device 30. The display apparatus 10 and the source device 30 may exchange the group owner intent value and determine the group owner and the group client based on the group owner intent value (for example, 0 to 15). The display apparatus 10 and the source device 30 may determine a device having a large intent value as the group owner GO by comparing the group owner intent value, and may determine the device having a small intent value as the group client.

When the determination of the group owner GO and the group client is completed, the group owner negotiation process may be completed to form the Wi-Fi Direct group between the display apparatus 10 and the source device 30. Accordingly, the W-Fi Direct connection (or P2P connection) (540) between the display apparatus 10 and the source device 30 may be completed. Thereafter, the display apparatus 10 and the source device 30 may execute a specific service (550).

As such, a conventional Wi-Fi Direct connection method between devices may require a complicated process. In addition, if the manufacturers of each device are different, there is a problem that each device requires a separate application for the Wi-Fi Direct connection. Some technologies utilize Near Field Communication (NFC) modules, but there are inconveniences in that NFC modules are required separately and tagging is required by accessing two of the devices.

In order to solve the problem, the disclosure may connect the display apparatus 10 and the source device 30 connected to the cloud account through the server 20 to W-Fi Direct.

Since the disclosure utilizes the information of devices pre-registered in the server 20 using the cloud account, the device discovery process and the service discovery process may be omitted and the W-Fi Direct connection procedure may be simplified.

Figure 7:
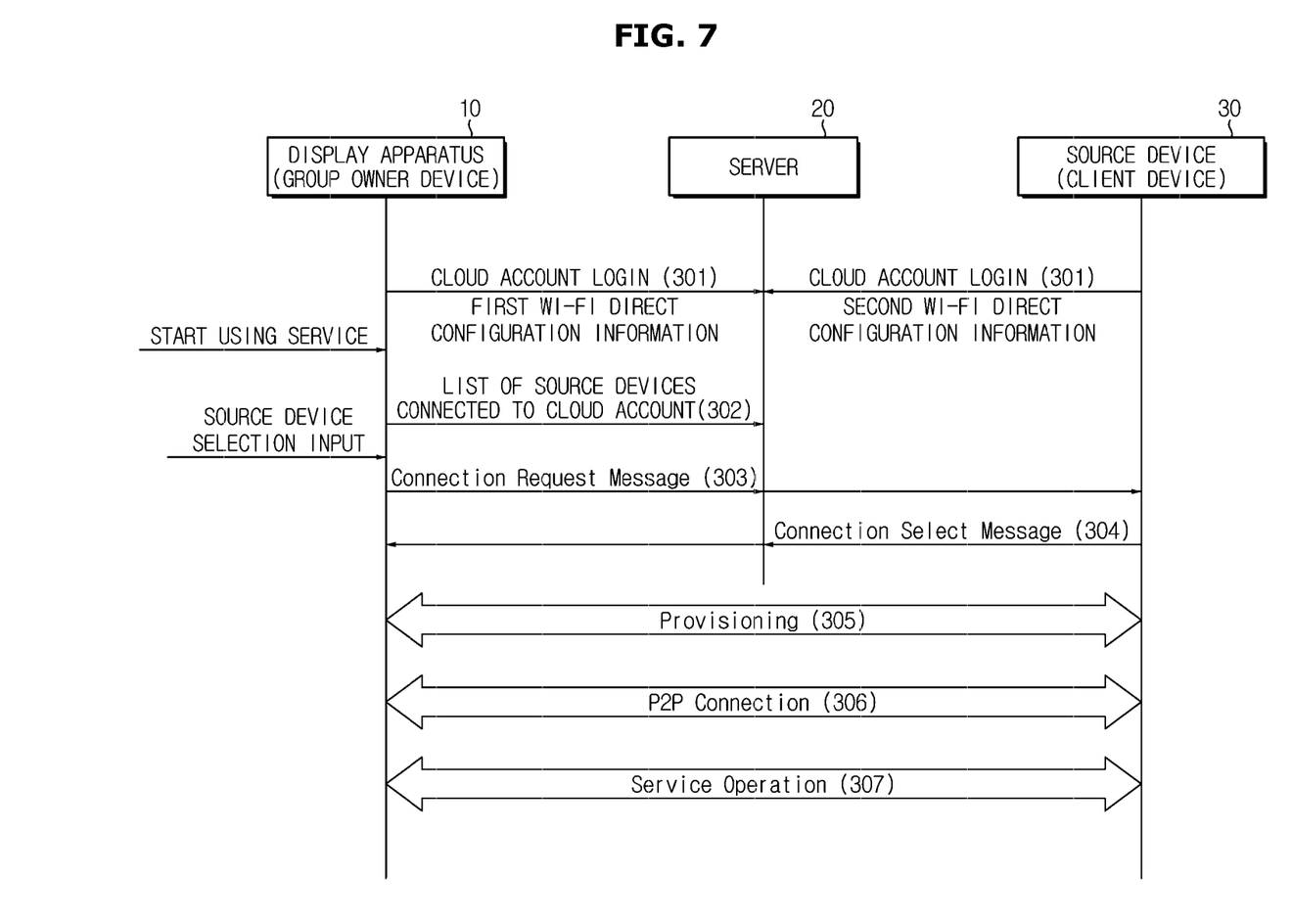
FIG. 7 is a flowchart for describing a Wi-Fi Direct connection method of a display apparatus according to exemplary embodiments of the disclosure.
Figure 8:
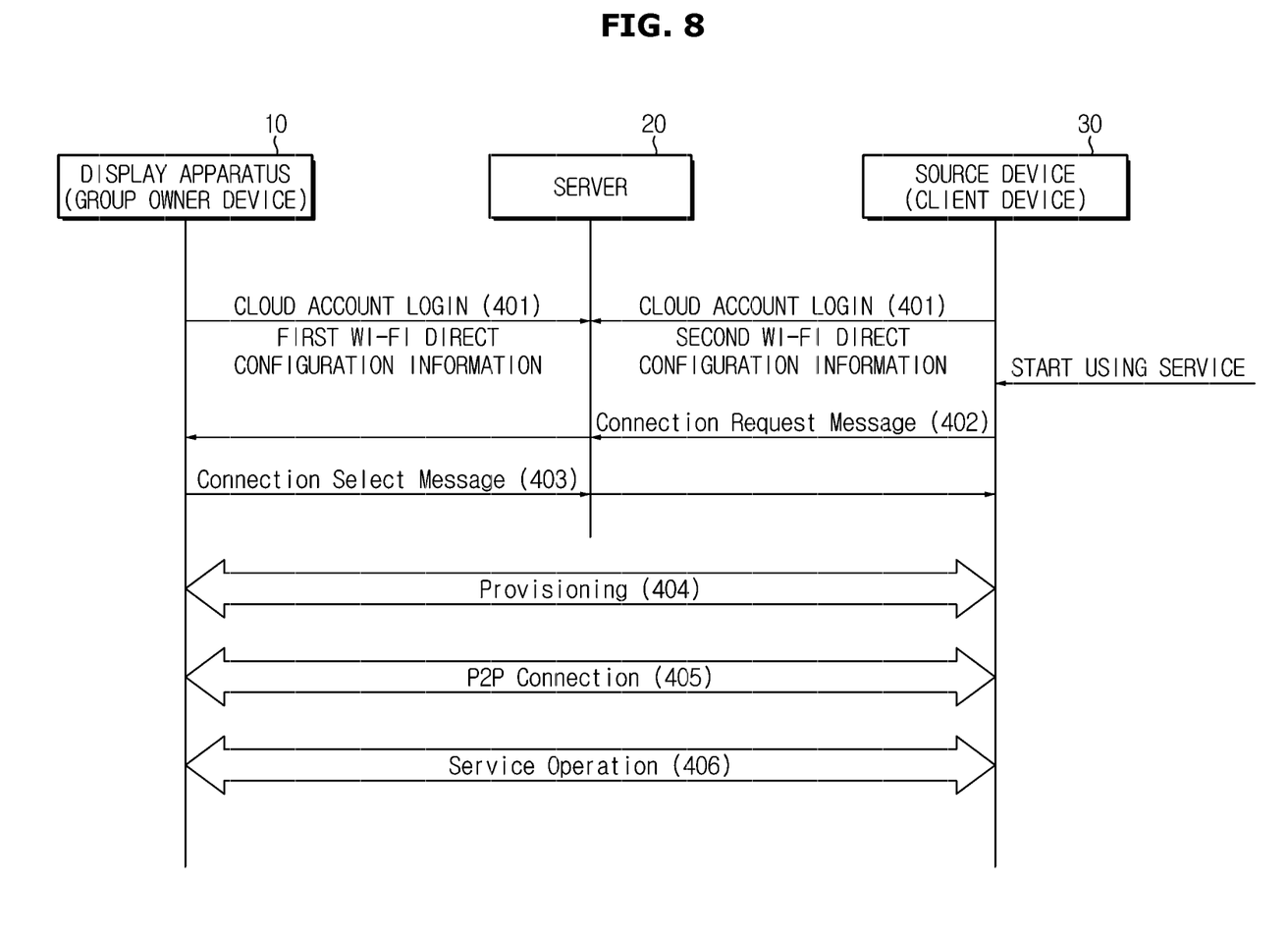
FIG. 8 is a flowchart for describing a Wi-Fi Direct connection method of a display apparatus according to exemplary embodiments of the disclosure.

FIG. 7 is a flowchart for describing a W-Fi Direct connection method of a display apparatus according to exemplary embodiments of the disclosure, and FIG. 8 is a flowchart for describing a W-Fi Direct connection method of a display apparatus according to exemplary embodiments of the disclosure.

Referring to FIG. 7, the display apparatus 10 and the source device 30 to which the W-Fi Direct connection is to be performed, have to be connected to the same cloud account, respectively (301). The display apparatus 10 and the source device 30 may access the cloud account through the server 20. Referring to the display apparatus 10, the display apparatus 10 may access the cloud account using cloud account information input by the user or cloud account information previously stored in the memory 120. The cloud account information may include a login ID and a login password. Since the Wi-Fi Direct connection is performed between the authenticated devices through the cloud account, security stability may be improved.

When the display apparatus 10 accesses the cloud account, the display apparatus 10 may transmit the first Wi-Fi Direct configuration information including the service set ID (SSID), the MAC address, the channel information, and the password to the server 20. The server 20 may store the first W-Fi Direct configuration information, which is the W-Fi Direct configuration information of the display apparatus 10, in a memory of the server 20, and may register with the cloud account.

Similarly, when the source device 30 is connected to the cloud account, the second W-Fi Direct configuration information, which is the W-Fi Direct configuration information of the source device 30, may be transmitted to the server 20 to register with the cloud account.

The first Wi-Fi Direct configuration information and the second W-Fi Direct configuration information may further include the service information that can be provided. As illustrated in FIG. 4, the first W-Fi Direct configuration information and the second W-Fi Direct configuration information may further include the SSID, the MAC address, the channel information, and the password. That is, the server 20 may store the W-Fi Direct configuration information of the devices connected to the cloud account.

When the display apparatus 10 starts executing the specific service (for example, the screen mirroring service) based on W-Fi Direct by the user's manipulation, the display apparatus 10 may attempt to establish the W-Fi Direct connection with the source device 30. When the W-Fi Direct connection process is started, the display apparatus 10 may obtain information of the source device 30 connected to the cloud account from the server 20. When there are the plurality of source devices 30 connected to the cloud, the display apparatus 10 may obtain the list including the plurality of source devices 30 from the server 20 (302).

When the source device 30 is selected by the user, the display apparatus 10 may generate the connection request message for the source device 30, and may transmit the connection request message to the source device 30 through the server 20 (303). In this case, the first W-Fi Direct configuration information, which is the W-Fi Direct configuration information of the display apparatus 10, may be transmitted to the source device 30 together with the connection request message. When there are the plurality of source devices 30, the display apparatus 10 may generate the connection request message for the source device 30 selected by the user input. One or more of the source devices 30 may be selected, and the display apparatus 10 may be connected by W-Fi Direct to one or more of the source devices 30.

In addition, the source device 30 may generate the connection select message in response to the connection request message, and may transmit the connection select message to the display apparatus 10 through the server 20 (304). In this case, the second Wi-Fi Direct configuration information, which is the W-Fi Direct configuration information of the source device 30, may be transmitted to the display apparatus 10 together with the connection select message. Therefore, the display apparatus 10 may exchange the Wi-Fi Direct configuration information with the source device 30.

As described above, since the first W-Fi Direct configuration information and the second W-Fi Direct configuration information respectively include the channel information of the display apparatus 10 and the channel information of the source device 30, a peer-to-peer (P2P) operating channel may be determined based on the first Wi-Fi Direct configuration information and the second W-Fi Direct configuration information. Therefore, a process of repeatedly exchanging the probe request message and the probe response message for device discovery may be omitted. Meanwhile, the P2P operation channel may include a 2.4 GHz band and a 5 GHz band.

In addition, since the first Wi-Fi Direct configuration information and the second W-Fi Direct configuration information include the service information that can be provided by the display apparatus 10 and the source device 30, respectively, the display apparatus 10 may obtain the Wi-Fi Direct configuration information of the source device 30 from the server 20 and immediately identify the service that the source device 30 may provide. When the start command of the screen mirroring service is input by the user, the display apparatus 10 may obtain information of the source device 30 that can provide the screen mirroring service among the plurality of source devices 30 connected to the cloud account from the server 20, and may display the source device 30 that can provide the screen mirroring service. That is, the process of transmitting and receiving the service discovery request message and the service discovery response message for service discovery between the display apparatus 10 and the source device 30 may be omitted.

As described above, since the disclosure uses the W-Fi Direct configuration information of devices registered in the cloud account through the server 20, the disclosure may identify a device that can be directly connected to W-Fi without a separate device discovery process, and may not include a separate service discovery process. Therefore, the W-Fi Direct connection procedure may be simplified.

When the display apparatus 10 receives the connection select message from the source device 30 through the server 20, the display apparatus 10 may perform the provision discovery and the group owner negotiation based on the first W-Fi Direct configuration information and the second W-Fi Direct configuration information, and may form the W-Fi Direct group (305). Accordingly, the Wi-Fi Direct connection (or P2P connection) between the display apparatus 10 and the source device 30 is completed (306). The provision discovery and the group owner negotiation are as described above. Meanwhile, the disclosure performs the W-Fi Direct connection between the authenticated devices through the cloud account, so the provision discovery process may be omitted.

Thereafter, the display apparatus 10 and the source device 30 may execute the specific service (for example, the screen mirroring service) (307).

Referring to FIG. 8, as illustrated in FIG. 7, it is assumed that the display apparatus 10 and the source device 30 to be directly connected to Wi-Fi are connected to the same cloud account, respectively (401). The display apparatus 10 and the source device 30 may each access the cloud account, transmit the first W-Fi Direct configuration information and the second W-Fi Direct configuration information to the server 20, and register the first W-Fi Direct configuration information and the second W-Fi Direct configuration information with the cloud account.

FIG. 8 illustrates that the source device 30 starts execution of the specific service based on Wi-Fi Direct and attempts to establish the Wi-Fi Direct connection with the display apparatus 10. That is, the source device 30 may generate the connection request message for the display apparatus 10 and transmit the connection request message to the display apparatus 10 through the server 20 (402). The display apparatus 10 may generate the connection select message in response to the connection request message, and may transmit the connection select message to the source device 30 through the server 20 (403).

The source device 30 may exchange the W-Fi Direct configuration information with the display apparatus 10, and may be connected to the display apparatus 10 by Wi-Fi Direct based on the first Wi-Fi Direct configuration information and the second W-Fi Direct configuration information (404, 405). The provisioning is as described above. Meanwhile, the disclosure performs the W-Fi Direct connection between the authenticated devices through the cloud account, so the provision discovery process may be omitted. Thereafter, the display apparatus 10 and the source device 30 may execute the specific service (406).

Although FIGS. 7 and 8 illustrate that the display apparatus 10 is determined as the group owner and the source device 30 is determined as the client, the source device 30 may be determined as the group owner.

In addition, when the display apparatus 10 forms the Wi-Fi Direct group with the client source device 30 as the group owner, the other client source device 30 may associate the Wi-Fi Direct group formed by the display apparatus 10.

Figure 9:
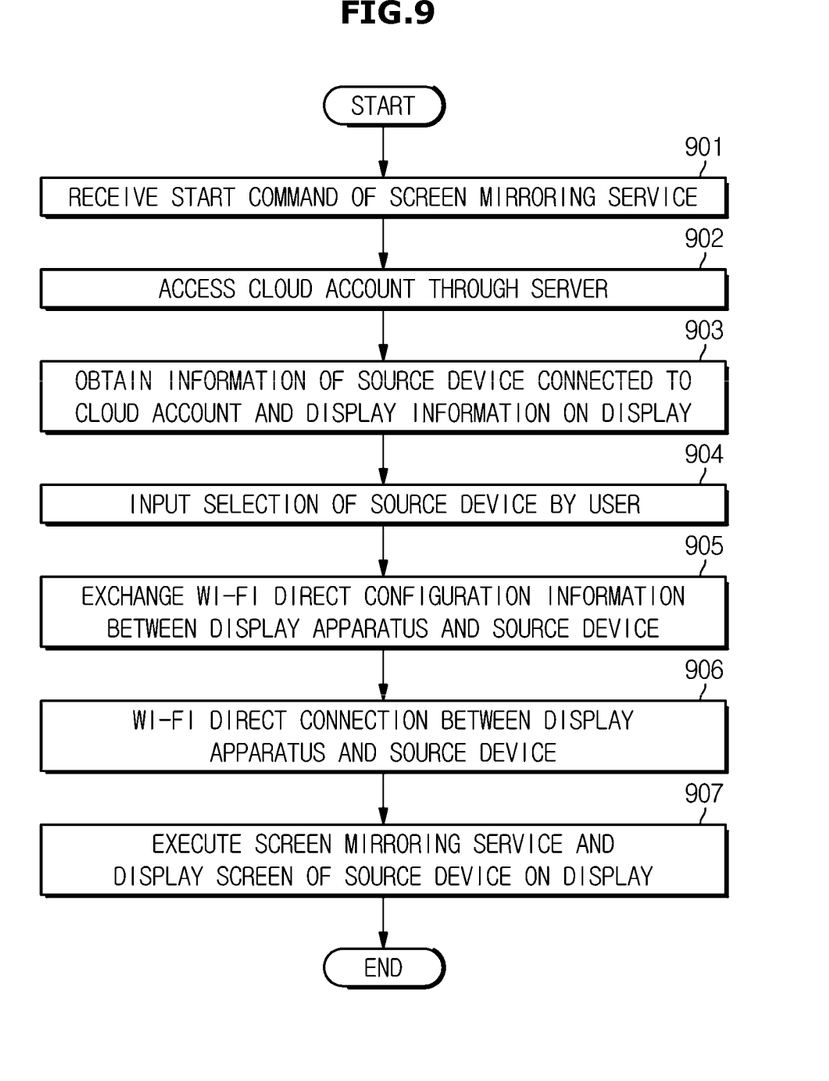
FIG. 9 is a flowchart for describing a control method of a display apparatus according to exemplary embodiments of the disclosure.

FIG. 9 is a flowchart for describing a control method of a display apparatus according to exemplary embodiments of the disclosure.

Referring to FIG. 9, the display apparatus 10 may receive the start command of the screen mirroring service from the user (901). The user may input the start command of the screen mirroring service using the input device such as the display 130 or a remote controller including the touch panel.

The controller 140 of the display apparatus 10 may access the cloud account through the server 20 (902). The display apparatus 10 may access the cloud account using the cloud account information input by the user or the cloud account information previously stored in the memory 120. The cloud account information may include the login ID and the login password. Meanwhile, the display apparatus 10 may be connected to the cloud account before the start command of the screen mirroring service is input from the user.

The controller 140 may obtain information of the source device 30 connected to the cloud account from the server 20 and display the information on the display 130 (903). As described with reference to FIG. 2, the controller 140 may generate the GUIs 32 and 34 including the source menu 32 configured to execute the screen mirroring service and provide information of the source device 30, and source icons 34 representing the plurality of source devices 30 (the phone, the camera, the Blu-ray player, the game console, the projector, as shown in FIG. 2) connected to the cloud account. The controller 140 may control the display 130 to output the generated graphical user interfaces 32 and 34. The graphical user interfaces 32 and 34 may be selected by the user.

The controller 140 may perform the W-Fi Direct connection with the source device 30 based on the first Wi-Fi Direct configuration information and the second Wi-Fi Direct configuration information obtained from the server 20 in response to an input of the user who selects the source device 30 (904, 905). As described above, the Wi-Fi Direct configuration information is exchanged between the display apparatus 10 and the source device 30, and the provision discovery and the group owner negotiation are performed, thereby completing the Wi-Fi Direct connection.

Finally, the controller 140 may execute the screen mirroring service to control the display 130 to output the same screen as the screen of the source device 30 (907). In addition, the display apparatus 10 may include the speaker, and may output the sound source being output by the source device 30 through the speaker.

According to the display apparatus and the method of controlling the display apparatus of exemplary embodiments, in executing the screen mirroring service, by connecting the Wi-Fi direct with the source device connected to the cloud account, the device discovery process and the service discovery process can be omitted and the W-Fi Direct connection procedure can be simplified.

In addition, the Wi-Fi Direct connection can be performed with the source device even if the user operates only the sink device, so that the screen mirroring service can be executed more easily.

Further, the Wi-Fi Direct connection between authenticated devices is performed through the cloud, thereby improving the security stability.

Meanwhile, the disclosed exemplary embodiments may be implemented in the form of a recording medium storing instructions that are executable by a computer. The instructions may be stored in the form of a program code, and when executed by a processor, the instructions may generate a program module to perform operations of the disclosed exemplary embodiments. The recording medium may be implemented non-transitory as a computer-readable recording medium.

The non-transitory computer-readable recording medium may include all kinds of recording media storing commands that can be interpreted by a computer. For example, the non-transitory computer-readable recording medium may be, for example, ROM, RAM, a magnetic tape, a magnetic disc, flash memory, an optical data storage device, etc.

Embodiments of the disclosure have thus far been described with reference to the accompanying drawings. It will be obvious to those of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. A display apparatus comprising:
a memory;
a display;
communication circuitry configured to communicate with a server and a source device; and
a controller configured to:

execute a screen mirroring service with the source device, receive a start command of the screen mirroring service from a user, in response to receiving the start command and connecting to a cloud account through the server, obtain service information of the source device from the server, wherein the display apparatus and source device are each connected to the cloud account through the server, and the service information is previously registered by the source device with the server and indicates the source device is capable of providing the screen mirroring service, control the display to display the source device capable of providing the screen mirroring service based on the service information obtained from the server, in response to receiving a selection of the source device, obtain second Wi-Fi Direct configuration information of the source device from the server, and perform a Wi-Fi Direct connection with the source device based on first Wi-Fi Direct configuration information stored in the memory and the second Wi-Fi Direct configuration information obtained from the server, wherein the second Wi-Fi Direct configuration information is previously registered by the source device with the server and includes information for the display apparatus to perform the Wi-Fi Direct connection with the source device, and control the display to mirror a screen of the selected source device.

2. The display apparatus according to claim 1, wherein the controller is further configured to:

obtain a plurality of source devices connected to the cloud account from the server and control the display to display the plurality of source devices; and perform the Wi-Fi Direct connection with the selected source device among the plurality of source devices.

3. The display apparatus according to claim 1, wherein the controller is further configured to:

access the cloud account using cloud account information input by the user or cloud account information previously stored in the memory; and register the first Wi-Fi Direct configuration information including a Service Set ID (SSID), a MAC address, channel information, and a password in the server.

4. The display apparatus according to claim 1, wherein the controller is further configured to:

in response to receiving the selection of the source device, generate a connection request message for the source device and transmit the connection request message to the source device through the server; and in response to receiving a connection select message of the source device sent in response to the connection request message being transmitted to the source device through the server, perform the Wi-Fi Direct connection.

5. The display apparatus according to claim 1, wherein the controller is further configured to determine a peer-to-peer (P2P) operating channel based on the first Wi-Fi Direct configuration information and the second Wi-Fi Direct configuration information.

6. The display apparatus according to claim 1, wherein the controller is further configured to generate a Wi-Fi Direct group by performing provision discovery and group owner negotiation.

7. The display apparatus according to claim 1, wherein the controller is further configured to:

perform the Wi-Fi Direct connection with the source device by performing a provision discovery process and a group owner negotiation process.

8. The display apparatus according to claim 1, further comprising:

a speaker, wherein the controller is further configured to control the speaker to output a sound being output by the source device.

9. A method of controlling a display apparatus, the method comprising:

receiving, by a controller, a start command of a screen mirroring service from a user;

accessing, by the controller, a cloud account through a server to connect the display apparatus to the cloud account;

in response to receiving the start command and connecting to the cloud account, obtaining service information of a source device from the server, wherein source device is connected to the cloud account through the server, and the service information is previously registered by the source device with the server and indicates the source device is capable of providing the screen mirroring service;

displaying, by the controller, the source device capable of providing the screen mirroring service and connected to the cloud account, on a display;

receiving, by the controller, a selection of the source device;

in response to receiving the selection of the source device, obtaining second Wi-Fi Direct configuration information of the source device from the server, and performing a Wi-Fi Direct connection with the source device based on first Wi-Fi Direct configuration information and the second Wi-Fi Direct configuration information obtained from the server, wherein the second Wi-Fi Direct configuration information is previously registered by the source device with the server and includes information for the display apparatus to perform the Wi-Fi Direct connection with the source device; and controlling, by the controller, the display to mirror a screen of the selected source device.

10. The method according to claim 9, wherein the displaying of the source device on the display comprises:

obtaining a plurality of source devices connected to the cloud account from the server and displaying the plurality of source devices on the display, and wherein the performing of the Wi-Fi Direct connection comprises:

performing the Wi-Fi Direct connection with the selected source device among the plurality of source devices.

11. The method according to claim 9, wherein the accessing of the cloud account comprises:

accessing the cloud account using cloud account information input by the user or cloud account information previously stored in a memory; and registering the first Wi-Fi Direct configuration information including a Service Set ID (SSID), a MAC address, channel information, and a password in the server.

12. The method according to claim 9, wherein the performing of the Wi-Fi Direct connection comprises:

in response to receiving the selection of the source device, generating a connection request message for the source device and transmit the connection request message to the source device through the server; and in response to receiving a connection select message of the source device sent in response to the connection request message being transmitted to the source device through the server, performing the Wi-Fi Direct connection.

13. The method according to claim 9, wherein the performing of the Wi-Fi Direct connection comprises:
determining a peer-to-peer (P2P) operating channel based on the first Wi-Fi Direct configuration information and the second Wi-Fi Direct configuration information.

14. The method according to claim 9, wherein the performing of the Wi-Fi Direct connection comprises:
generating a Wi-Fi Direct group by performing provision discovery and group owner negotiation.

15. The method according to claim 9, wherein performing the Wi-Fi Direct connection with the source device includes performing a provision discovery process and a group owner negotiation process.

16. The method according to claim 9, further comprising:
receiving, by the controller, a sound being output by the source device and outputting the sound from a speaker.

\* \* \* \* \*